US006778067B2

(12) United States Patent
Kakuta

(10) Patent No.: US 6,778,067 B2
(45) Date of Patent: Aug. 17, 2004

(54) KEYLOCK SWITCH AND KEYLOCK SWITCH SYSTEM

(75) Inventor: Kazumasa Kakuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 410 days.

(21) Appl. No.: 09/771,695

(22) Filed: Jan. 30, 2001

(65) Prior Publication Data

US 2002/0027161 A1 Mar. 7, 2002

(30) Foreign Application Priority Data

Sep. 5, 2000 (JP) ....................................... 2000-268741

(51) Int. Cl.[7] ........................... G05B 23/00; G06F 7/00; G08B 29/00; H04B 1/00; H04Q 9/00

(52) U.S. Cl. ...................... 340/5.62; 340/10.34; 70/271

(58) Field of Search ................................ 340/5.6, 5.62, 340/5.65, 5.66, 5.67, 10.34; 70/271, 237, 277, 278, 279

(56) References Cited

U.S. PATENT DOCUMENTS 5,003,801 A * 4/1991 Stinar et al. ............... 70/278.3
5,140,317 A * 8/1992 Hyatt et al. ................ 340/5.25
6,078,265 A * 6/2000 Bonder et al. ............. 340/5.23
6,209,367 B1 * 4/2001 Hyatt et al. ................ 70/278.2
6,351,206 B1 * 2/2002 Schweiger et al. ........ 340/5.64
6,437,684 B1 * 8/2002 Simeray .................... 640/5.67
6,552,650 B1 * 4/2003 Gokcebay et al. ......... 340/5.65

FOREIGN PATENT DOCUMENTS

JP 61-162686 7/1986

* cited by examiner

*Primary Examiner*—Brian Zimmerman
*Assistant Examiner*—Nam V Nguyen
(74) *Attorney, Agent, or Firm*—Staas & Halsey LLP

(57) ABSTRACT

A keylock switch and a keylock switch system receive a supply of power from two terminals of the keylock switch, and output key data, affording a small and reasonably-priced keylock switch and keylock switch system, of a drastically expanded field of application of the keylock switch, and improved security in various fields. A keylock switch and a keylock switch system moreover can maintain the function of a conventional lock utilizing metal material. A signal read by read means may be isolated from a power, or a power source, stored in charge storing means to realize both supplying of power and outputting of key data through two terminals. Further, the state inside the keylock switches may be quickly reset to an initial state, to prepare for a next use.

16 Claims, 11 Drawing Sheets

(a)

(b)

(a)

(b)

KEYLOCK SWITCH AND KEYLOCK SWITCH SYSTEM

BACKGROUND OF THE INVENTION

1. Field of the Invention

This invention relates to a keylock switch for transmitting key data for actuating a locking or releasing operation to a lock device through electric contact, and also to a keylock switch system using this keylock switch.

2. Description of the Related Art

Locks of houses and offices, locks of car doors, locks of engine starters, and so forth, generally employ a configuration in which a metal key that appropriately fits to a cylinder of a lock actuates locking and releasing operations.

Electronic locks using input of a personal identification number as a key or using storage media such as a magnetic card, an IC card, a bar code label, etc, as the key have also been put into practical application.

On the other hand, an identification function in automated teller machines installed in financial institutions and a security function of personal computers generally release the lock that is software-wise locked up for a designated processing by inputting a password. These functions, too, can be regarded as an electronic keylock.

These electronic keylock each generally comprise an inputting part for inputting key data as an electronic key, a checking part for checking legality of inputted key data and an operating part for executing a locking/releasing operation in accordance with the checking result.

The inputting part of the electronic keylock is so constituted as to correspond to the kind of a keylock switch which input key data. An electronic keylock system using the input of a personal identification number as a key, for example, is equipped with a numeric keypad as the inputting part for inputting the personal identification number. A system using an storage media as a key includes an IC card reader, a magnetic card reader or a bar code scanner as the inputting part of respective systems in accordance with the kind of the storage media as the key.

The electronic keys such as the input of the personal identification number, the IC card, the bar code, etc, have the feature that forging of such keys is more difficult than that of the conventional metal keys. Conventional metal keys have limited width and number of grooves, the shape and number of teeth, and their combination, that could be formed onto it, so the variation of metal keys is therefore limited. In contrast, an infinite number of combinations are logically possible for keylock switches by elongating the length of the key data. The longer the key data, the more difficult it becomes to forge the keylock switch with the result of the improvement of security.

Therefore, security of a higher level can be secured by replacing the combination of the metal key with the metal lock by a combination of a keylock switch with an electronic keylock or a combination of a metal lock with an electronic keylock.

In practice, however, there is a limit to the length of the personal identification number one can bear in mind, and this in turn limits security that is expected in the system using the input of the personal identification number or the password as the key.

On the other hand, the keylock switch using a storage media such as an IC card, a magnetic card or a bar code label can store key data having a sufficient length. Therefore, an electronic keylock system employing such a keylock switch is expected to provide security of high level.

To input the key data written to the storage media described above, however, both hardware and software of a large scale such as an IC card reader or a magnetic card reader are necessary.

The IC card used ordinarily, for example, has eight output terminals for outputting in parallel the data stored in a memory in an 8-bit unit. Therefore, a contact type IC card reader that is directly connected to the output terminals and receives the data has at least eight input terminals and a wiring circuit for transmitting in parallel the signals it receives to a checking part. A system that reads in a non-contact arrangement the key data stored in the memory of the IC card must include a radio transmission device for transmitting the key data on the IC card and means for receiving the key data on the IC card reader. A magnetic head and a demodulator are indispensable for the magnetic card reader. To read the bar code symbol, a bar code scanner and a demodulator are also indispensable.

As described above, the electronic keylock system using the storage media as the keylock switch requires many system constituents, and thus is more expensive than the combination of the metal key with the metal lock. Also, because of the need for many constituents, there is a limit to the reduction of the size of both keylock switch and electronic keylock.

For the reasons described above, the system using the keylock switch and the electronic keylock has been adopted for only those applications which require security of a high degree, such as research institutes and factories.

On the other hand, a growing number of trespassing on small-scale buildings such as ordinary houses and offices, theft of cars, illegal transaction through automated teller machines, illegal utilization of personal computers, and so forth, have become a serious problem in recent years.

SUMMARY OF THE INVENTION

It is an object of the present invention to provide reasonably-priced and compact keylock switch and keylock switch system that can guarantee safety from trespassing on small-scale buildings such as ordinary houses and offices, theft of cars, illegal transaction through automated teller machines, illegal utilization of personal computers, and so forth.

It is another object of the present invention to drastically expand the application field of a keylock switch and a keylock switch system by accomplishing an reasonably-priced and compact keylock switch and a keylock switch system using the keylock switch.

It is still another object of the present invention to accomplish a keylock switch that still has the function of a conventional lock formed of metal members and a keylock switch system using the keylock switch, and apply them in fields where metal keys are widely used, to improve security by improving the drawbacks of the metal key.

It is still another object of the present invention to quickly reset an internal state of a keylock switch after output of key data is completed, to prepare for the next use.

It is a further object of the present invention to provide an art to reliably deliver only a signal representing key data from a keylock switch to an electronic keylock, to stably detect the signal representing key data in the electronic keylock.

The objects described above can be accomplished by a first keylock switch having a configuration in which a charge storing section is charged by power supplied through first and second terminals, and a read section reads key data stored in a memory by utilizing power stored in the charge storing section and outputs the key data through the first and second terminals.

In the first keylock switch described above, the terminals provided to the keylock switch can be limited to only two. Therefore, it is possible to minimize both the space for the terminals themselves and the space for wiring the terminals to circuit elements.

The objects described above can be accomplished by a second keylock switch having a configuration in which a keylock switch circuit comprising a charge storing section, a memory and a read section is buried into an insulating part covering at least a part of a head portion of a metal key, a first terminal is disposed at a portion at which the insulating part and the metal key keep contact, and a second terminal is disposed on a surface of the insulating part at which the insulating part is out of contact with the metal key.

In the second keylock switch having the configuration described above, the metal key itself is used as the first terminal. Therefore, the number of a terminal to be disposed afresh is limited to one, and a function of inputting key data can be added to the original function of the metal key itself.

The objects described above can be accomplished by a first keylock switch system comprising a first keylock switch and a first electronic keylock, the first keylock switch having a configuration in which a charge storing section is charged by power supplied through first and second terminals, and a read section reads key data stored in a memory and outputs the key data through the first and second terminals, the first electronic keylock including third and fourth terminals for forming one junction when they come into contact with the first and second terminals, respectively, a power source for supplying power to the keylock switch through the third and fourth terminals, and a detecting section for detecting key data from a signal inputted through the third and fourth terminals.

In the first keylock switch system having the configuration described above, the contacts between the first keylock switch and the first electronic keylock can be limited to only two points. Therefore, in both first keylock switch and first electronic keylock, it is possible to minimize the space for the terminals themselves and the space required for wiring the terminals to circuit elements.

The objects described above can be accomplished by a second keylock switch system comprising a second keylock switch and a second electronic keylock, the second keylock switch having a configuration in which a keylock switch circuit comprising a charge storing section, a memory and a read section is buried into an insulating part covering at least a part of a head portion of a metal key, a first terminal is disposed at a portion at which the insulating part and the metal key keep mutual contact and a second terminal is disposed on a surface of the insulating part at which the insulating part is out of contact from the metal key, the second electronic keylock including an electronic keylock circuit comprising a third terminal so disposed as to keep contact with a metal part contacting the metal key, a fourth terminal for forming a junction when coming into contact with the second terminal, a power source for supplying power to the second keylock switch through the third and fourth terminals, and a detecting section for detecting key data from a signal inputted through the third and fourth terminals.

In the second keylock switch system described above, one of the two junctions is formed when the metal key is inserted into the metal part that constitutes the lock. Therefore, the number of the terminal to be disposed afresh on the second keylock switch and on the second electronic lock is limited to one. Furthermore, a function of inputting the key data and a function of actuating a locking or a releasing operation in accordance with the acceptance of the key data can be added to the function that the combination of the metal key with the metal lock originally has.

The objects described above can be respectively accomplished by third and fourth keylock switches each including, in addition to the first or second keylock switch, a rectifying section for restricting power supplying directions between the first terminal and the charge storing section and between the second terminal and the charge storing section.

The third and fourth keylock switches having the configuration described above can output the signal representing the key data stored in the memory without being affected by power stored in the charge storing section.

The objects described above can be accomplished by a third keylock switch system comprising a third keylock switch and a first electronic keylock and by a fourth keylock switch system comprising a fourth keylock switch and a second electronic keylock.

In the third and fourth keylock switch systems having the configurations described above, rectification of the rectifying section provided in the third or fourth keylock switch can output the signal representing key data stored in the memory without being affected the power stored in the charge storing section, and can transmit the key data to the detecting section.

The objects described above can be accomplished by, in addition to the first or second keylock switch of the first or second keylock switch system, a fifth or sixth keylock switch including a discharging section for discharging power remaining in the charge storing section provided in the keylock switch, in which the discharging is done in accordance with opening the two contacts formed between the keylock switch and the electronic keylock.

In the fifth and sixth keylock switches respectively having the configurations described above, the discharging section discharges power remaining in the charge storing section in accordance with the release of the junction between the keylock switch and the electronic keylock. Therefore, each component in the keylock switch can be quickly reset, so that the keylock switch can be ready for the next junction.

The objects described above can be accomplished by, in addition to the first electronic keylock provided to the first keylock switch system or the second electronic keylock provided to the second keylock switch system, third and fourth electronic keylocks each including an isolating section for isolating an AC signal appearing between the third and fourth terminals from the power source.

Since the third and fourth electronic keylocks described above include the isolating section, the read section can transmit to the detecting section the signal outputted through the two junctions without being affected by the power source.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENT

[Principle]

First, explanation is given on the principle of a keylock switch and a keylock system according to the invention.

Figure 1:
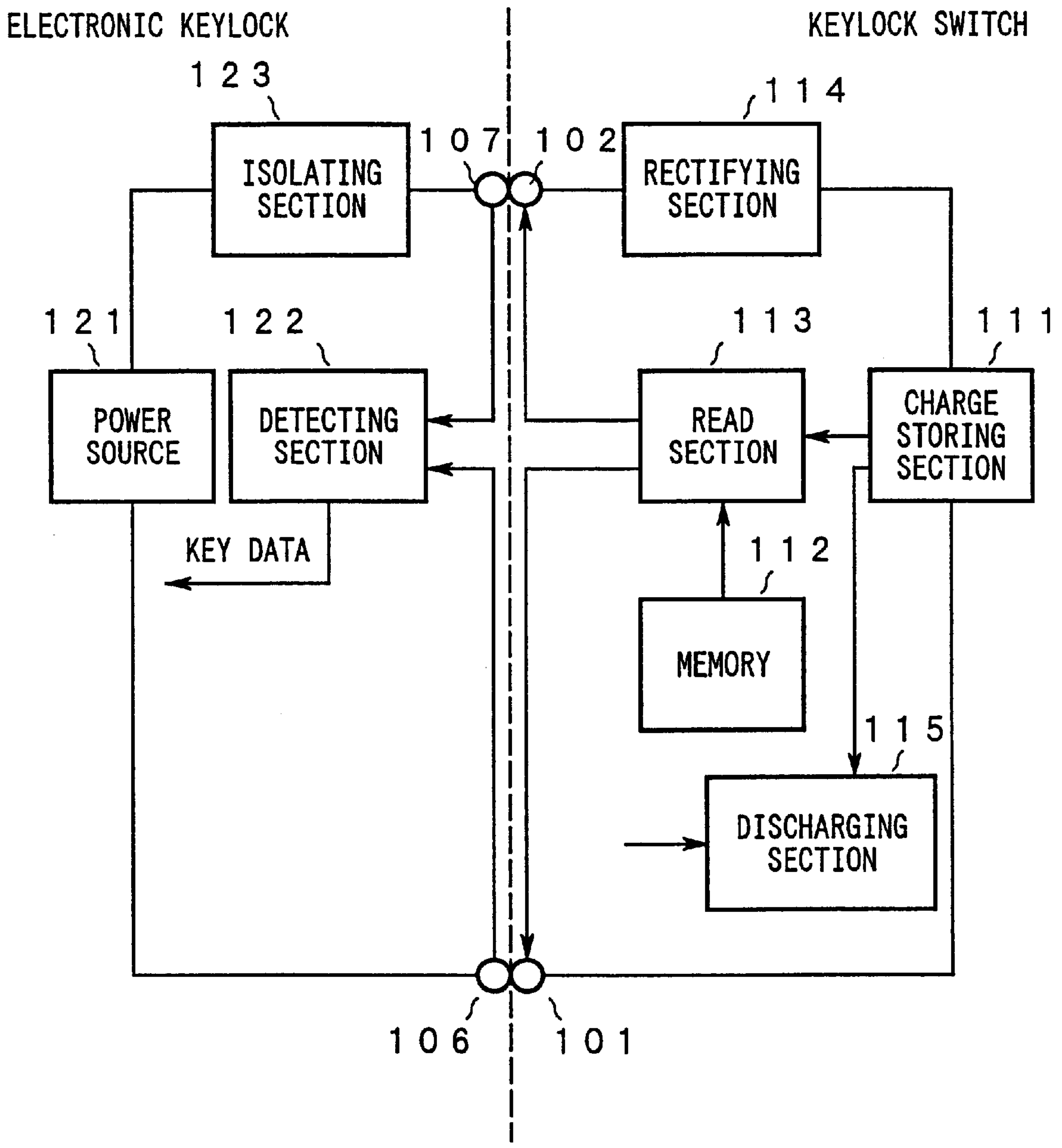
FIG. 1 shows the principle of a first keylock switch and a first keylock switch system using the first keylock switch according to the present invention.

FIG. 1 shows the principle of a first keylock switch and that of a first keylock switch system using this keylock switch according to the present invention.

The first keylock switch shown in FIG. 1 comprises a first terminal 101, a second terminal 102, a charge storing section 111, a memory 112 and a read section 113.

The principle of the first keylock switch according to the present invention is as follows.

The first terminal 101 and the second terminal 102 are electric contacts. The charge storing section 111 is connected between the first terminal 101 and the second terminal 102 and is charged by power supplied through these first and second terminals 101 and 102. The memory 112 stores key data having a predetermined length. The read section 113 receives the supply of power stored in the charge storing section 111, reads out the key data stored in the memory 112 and output this key data through the first and second terminals 101 and 102.

The first keylock switch having such a configuration operates in the following way.

The charge storing section 111 is charged by power supplied through the first and second terminals 101 and 102. The read section 113 reads out the key data stored in the memory 112 by using power stored in the charge storing section 111 and outputs the key data through the first and second terminals 101 and 102. In consequence, the supply of power to the keylock switch and the output of the key data can be achieved by having only two contacts.

Figure 2:
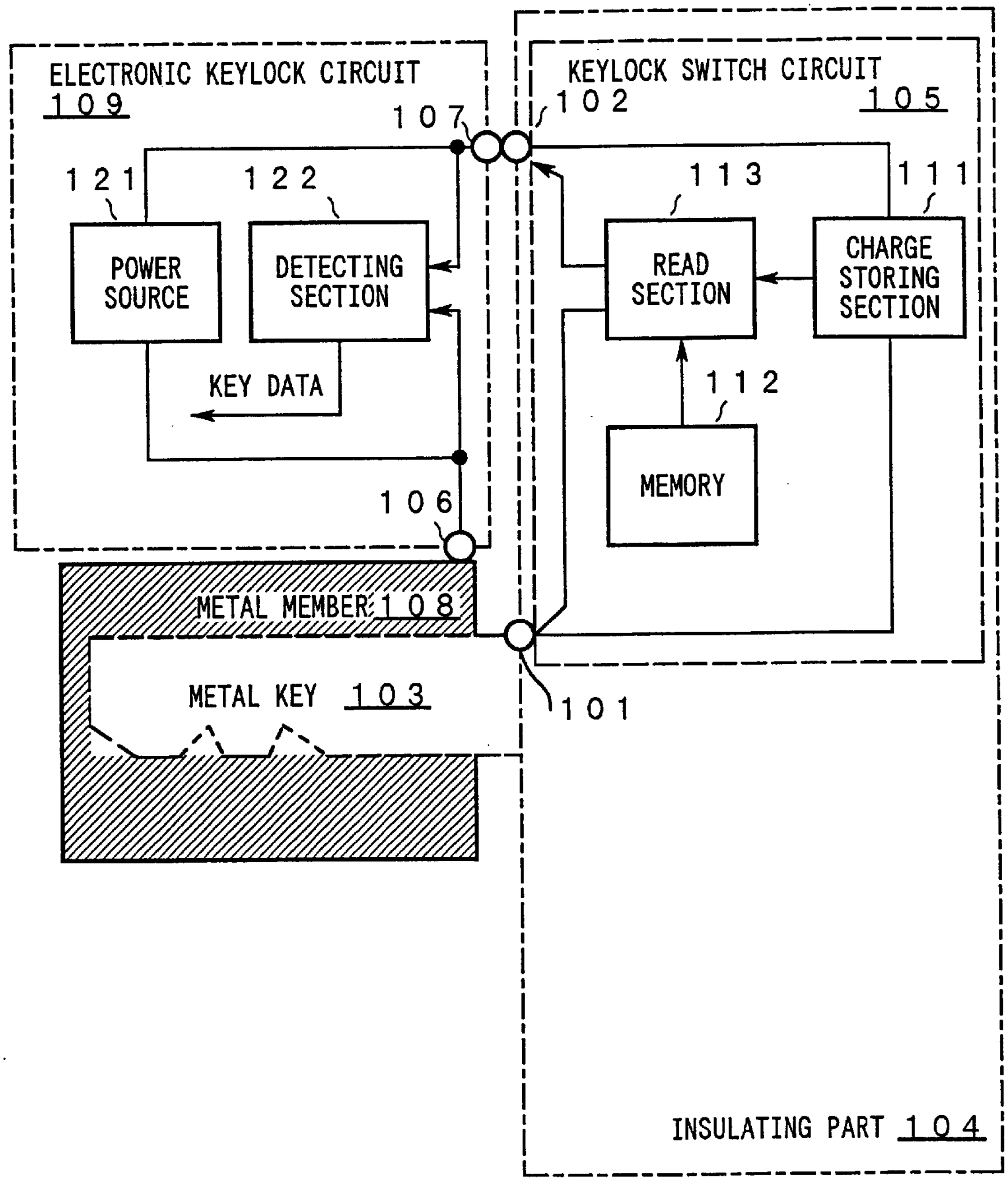
FIG. 2 shows the principle of a second keylock switch and a second keylock switch system using the second keylock switch according to the present invention.

FIG. 2 shows the principle of a second keylock switch according to the present invention and the principle of a second keylock switch system using this keylock switch according to the present invention.

The second keylock switch shown in FIG. 2 comprises a metal key 103, an insulating part 104 and a keylock switch circuit 105. The keylock switch circuit 105 includes a charge storing section 111, a memory 112, a read section 113, a first terminal 101 and a second terminal 102.

The principle of the second keylock switch according to the present invention is as follows.

The metal key 103 operates mechanical components provided to a lock. The insulating part 104 covers at least a part of a head portion provided to the metal key 103. A keylock switch circuit 105 disposed inside the insulating part 104 includes a first terminal 101 disposed at the contact portion between the insulating part 104 and the metal key 103, a second terminal 102 disposed on the surface of the insulating part 104 that is out of contact from the metal key 103, a charge storing section 111 connected between the first terminal 101 and the second terminal 102, for being charged by power supplied through these first and second terminals 101 and 102, a memory 112 for storing key data having a predetermined length and a read section 113 for receiving the supply of power stored in the charge storing section 111 and reading the key data stored in the memory 112 and outputting the key data through the first and second terminals 101 and 102.

The second keylock switch having such a configuration operates in the following way.

In the keylock switch circuit 105 buried into the insulating part 104 covering at least a part of the head portion of the metal key 103, the charge storing section 111 is charged by power supplied through the first terminal 101, that is disposed at the contact portion between the insulating part 104 and the metal key 103, and through the second terminal 102 disposed on the surface of the insulating part 104 that is out of contact from the metal key 103. The read section 113 reads out the key data stored in the memory 112 by using power stored in the charge storing section 111 and outputs the key data through the first and second terminals 101 and 102. In this way, the metal key 103 itself can be utilized as the first terminal.

The first keylock switch system shown in FIG. 1 comprises the first keylock switch and a first electronic keylock. The first keylock switch comprises a first terminal 101, a second terminal 102, a charge storing section 111, a memory 112, and a read section 113. The first electronic keylock comprises a third terminal 106, a fourth terminal 107, a power source 121 and a detecting section 122.

The principle of the first keylock switch system according to the present invention is as follows.

In the first keylock switch, the first terminal 101 and the second terminal 102 are electric contacts. The charge storing section 111 is connected between the first terminal 101 and the second terminal 102 and is charged by power supplied through the first and second terminals 101 and 102. The memory 112 stores key data having a predetermined length. The read section 113 receives the supply of power stored in the charge storing section 111, reads the key data stored in the memory 112 and outputs the key data through the first and second terminals 101 and 102. The first electronic keylock includes two junctions when coming into contact with the first and second terminals 101 and 102, a power source 121 for supplying driving power to the keylock switch through the third and fourth terminals 106 and 107, and a detecting section 122 for detecting the key data from a signal appearing between the third and fourth terminals 106 and 107.

The first keylock switch system having the configuration described above operates in the following way.

The first and second terminals 101 and 102 of the first keylock switch are brought into contact with the third and fourth terminals 106 and 107 of the first electronic keylock to form two junctions. The charge storing section 111 is charged by power supplied from the power source 121 which is provided to the electronic keylock through these junctions. The read section 113 reads out the key data stored in the memory 112 by using power stored in the charge storing section 111 and outputs the signal representing the key data through the two junctions. The detecting section 122 detects the key data from this signal.

The second keylock switch system shown in FIG. 2 has a second keylock switch which includes a metal key 103, an insulating part 104, a keylock switch circuit 105, and a second electronic keylock which has a metal part 108 and an electronic keylock circuit 109. The keylock switch circuit 105 includes a first terminal 101, a second terminal 102, a charge storing section 111, a memory 112, and a read section 113. The electronic keylock circuit 109 includes a third terminal 106, a fourth terminal 107, a power source 121, and a detecting section 122.

The principle of the second keylock switch system according to the present invention is as follows.

In the second keylock switch, the metal key 103 is for operating mechanical components provided to a lock, and includes an insulating part 104 that covers at least a part of the head portion of the metal key 103. In the keylock switch circuit disposed inside the insulating part 104, the first terminal 101 is disposed at a contact portion between the insulating part 104 and the metal key 103, and the second terminal is disposed on the surface of the insulating part 104 that is out of contact from the metal key 103. The charge storing section 111 is connected between the first terminal 101 and the second terminal 102, and is charged by power supplied through these first and second terminals 101 and 102. The memory 112 stores key data having a predetermined length. The read section receives the supply of power stored in the charge storing section 111, reads the key data stored in the memory 112 and outputs the key data through the first and second terminals 101 and 102. In the second electronic keylock, on the other hand, the third terminal 106 is so disposed as to keep contact with the metal part 108 that in turn keeps contact with the metal key 103. The fourth terminal 107 comes into contact with the second terminal 102 and forms one of junctions. The power source 121 feeds driving power to the keylock switch through the third and fourth terminal 106 and 107. The detecting section 122 detects the key data from a signal appearing between the third terminal 106 and the fourth terminal 107.

The second keylock switch system having the configuration described above operates in the following way.

The first terminal 101 disposed at the part making contact between the insulating part 104 and the metal key 103 and the second terminal 102 disposed on the surface of the insulating part 104 that is out of contact from the metal key 103 are brought into contact with the third and fourth terminals 106 and 107 provided to the second electronic keylock, respectively, forming two junctions. The charge storing section 111 is charged by a power supplied from the power source through these junctions. The read section 113 reads out the key data stored in the memory 112 by using this power and outputs the signal representing the key data through the two junctions.

The detecting section 122 detects the key data from this signal.

The third keylock switch shown in FIG. 1 includes a first keylock switch and a rectifying section 114. The principle of the third keylock switch according to the present invention is as follows.

The rectifying section 114 restricts the power supplying direction between the first terminal 101 and the charge storing section 111 and between the second terminal 102 and the charge storing section 111.

The third keylock switch having the configuration described above operates in the following way.

Rectification of the rectifying section 114 restricts the direction of the power supply in the circuit comprising the first terminal 101, the second terminal 102, and the charge storing section 111, and can prevent back-flow of the charge stored in the charge storing section 111.

Also, the second keylock switch shown in FIG. 2 and the rectifying section 114 described above together constitute a fourth keylock switch.

Since the principle of the fourth keylock switch and its operation are analogous to those of the third keylock switch described above, explanation is hereby omitted.

The third keylock switch system shown in FIG. 1 includes a first electronic keylock and a third keylock switch, and the third keylock switch includes a first keylock switch and a rectifying section 114.

The principle of the third keylock switch system according to the present invention is as follows.

The rectifying section 114 provided to the third keylock switch restricts the power supplying direction between the first terminal 101 and the charge storing section 111 and between the second terminal 102 and the charge storing section 111.

The third keylock switch system having the configuration described above operates in the following way.

Rectification of the rectifying section 114 restricts the power supplying direction in the circuit including the first terminal 101, the second terminal 102, and the charge storing section 111 with the result that the power supplying direction between the charge storing section 111 and the power source is also restricted.

Incidentally, the second electronic keylock shown in FIG. 2 and the third keylock switch described above together constitute a fourth keylock switch system.

Since the principle of the fourth keylock switch system and its operation are analogous to those of the third keylock switch system described above, the explanation is hereby omitted.

A fifth keylock switch shown in FIG. 1 includes a first keylock switch provided to a first keylock switch system and a discharging section 115.

The principle of the fifth keylock switch according to arts the present invention is as follows.

The discharging section 115 discharges power remaining in the charge storing section 111 provided to the first keylock switch when the junctions formed by the first and second terminals 101 and 102 provided to the first keylock switch and the third and fourth terminals 106 and 107 provided to the first electronic keylock are released.

The fifth keylock switch having the configuration described above operates in the following way.

As the two junctions are released, the discharging section 115 discharges power remaining in the charge storing section 111.

Incidentally, the second keylock switch provided to the second keylock switch system shown in FIG. 2 and the discharging section 115 described above together constitute a sixth keylock switch.

Since the principle of this sixth keylock switch and its operation are analogous to those of the fifth keylock switch described above, the explanation is hereby omitted.

A third electronic keylock shown in FIG. 1 includes a first electronic keylock and an isolating section 123.

The principle of the third electronic keylock according to the present invention is as follows.

In the third electronic keylock, the isolating section 123 isolates an AC signal appearing between a third terminal 106 and a fourth terminal 107 from a power source 121.

The third electronic keylock having the configuration described above operates in the following way.

The isolating section 123 isolates the AC signal appearing between the third terminal 106 and the fourth terminal 107 from the power source 121, so therefore transmits the signal to only the detecting section 122.

Incidentally, the second electronic keylock shown in FIG. 2 and the isolating section 123 described above together constitute a fourth electronic keylock. Since the principle of this fourth electronic keylock and its operation are analogous to those of the third electronic keylock described above, the explanation is hereby omitted.

[Embodiment]

Embodiments of the present invention will be explained in detail with reference to the accompanying drawings.

Figure 3:
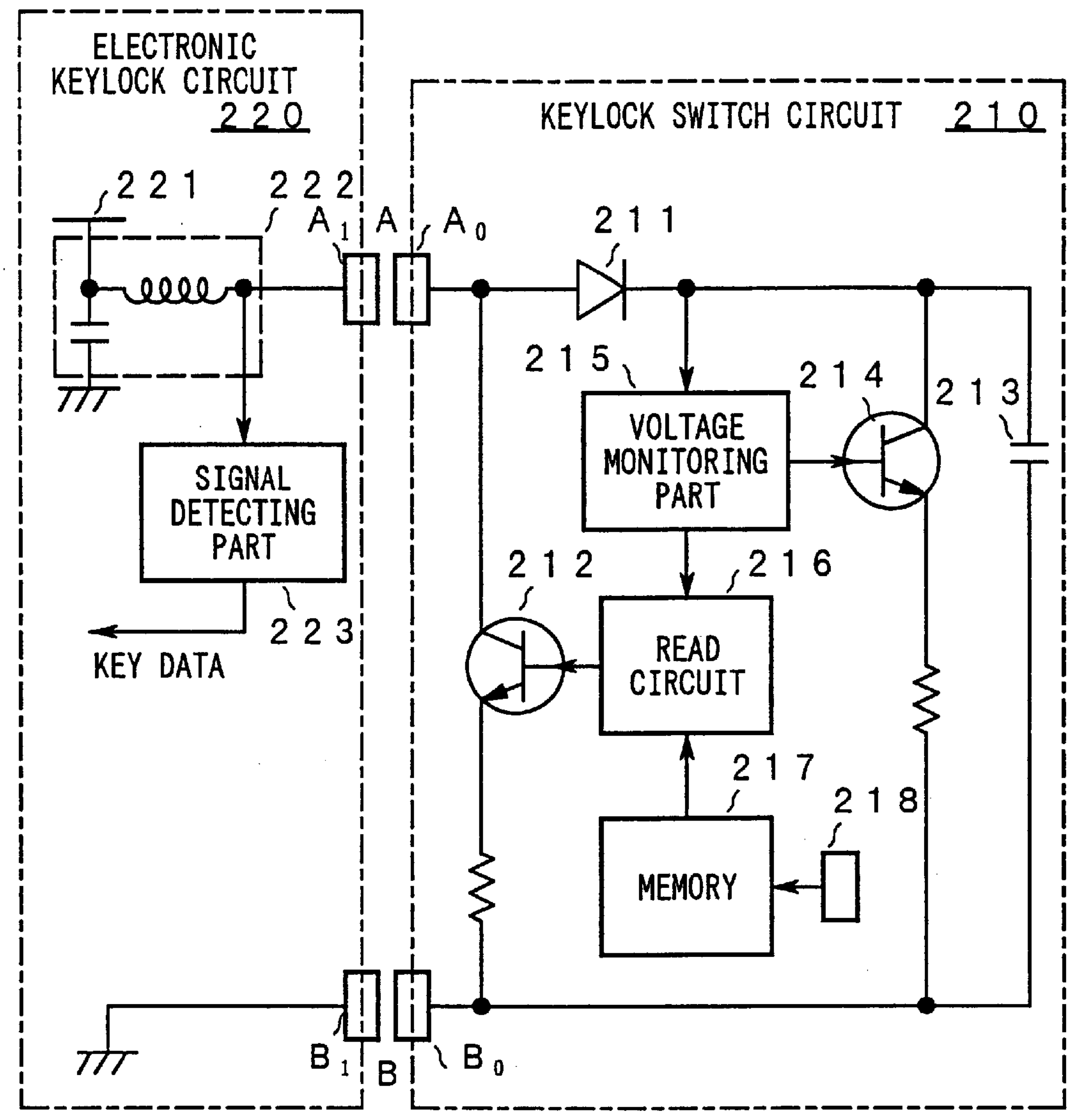
FIG. 3 shows the first embodiment of the first keylock switch according to the present invention.

FIG. 3 shows a first keylock switch according to the first embodiment of the present invention.

In the keylock switch circuit 210 shown in FIG. 3, one of the terminals A, that constitutes a junction indicated by symbol A is connected in parallel with an anode of a diode 211 and a collector of a transistor 212. One of the ends of a capacitor 213 and a collector of a transistor 214 are connected in parallel with a cathode of the diode 211 described above. The other end of this capacitor 213 is connected to one of the terminals B, that constitute a junction indicated by symbol B as shown in FIG. 3. Emitters of both transistors 212 and 214 are connected to this terminal $B_0$ through resistors, respectively.

A voltage monitoring part 215 shown in FIG. 3 monitors a potential difference between both ends of the capacitor 213 described above, and controls ON/OFF the transistor 214 as well as the read operation by a read circuit 216 on the basis of the comparison result of the potential difference with a predetermined threshold. The read circuit 216 serially reads out the key data stored in a memory 217 and inputs this read signal to the base of the transistor 212.

On the other hand, a power source 221 provided to an electronic keylock circuit 220 shown in FIG. 3 is connected to the other terminal $A_1$ constituting the junction A through an impedance that is included in an impedance circuit 222. A signal inputted through this terminal $A_1$ is inputted to a signal detecting part 223. The other terminal $B_1$ constituting the junction B is grounded in this electronic keylock circuit 220.

Next, explanation is given on an operation of transmitting the key data from the keylock switch circuit to the electronic keylock circuit each having the configuration described above.

Figure 4:
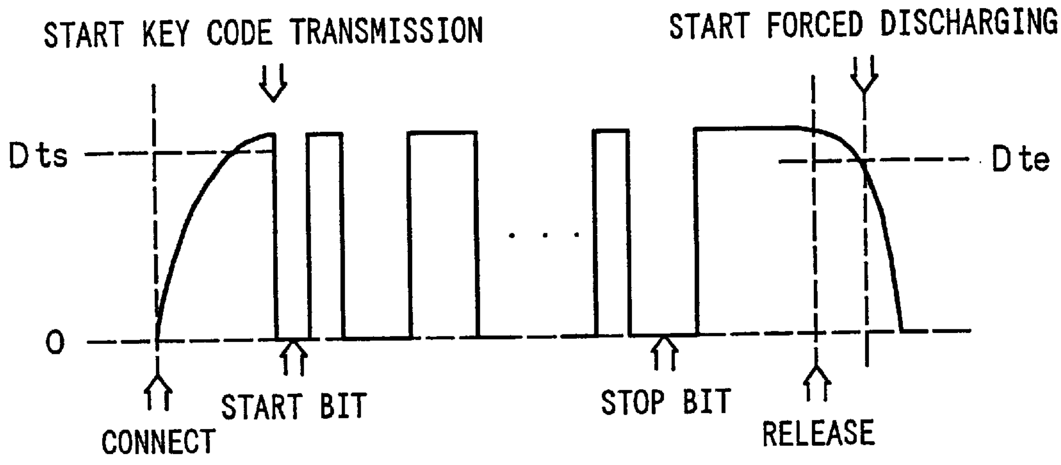
FIG. 4 explains an operation of transmitting key data.
Figure 4:
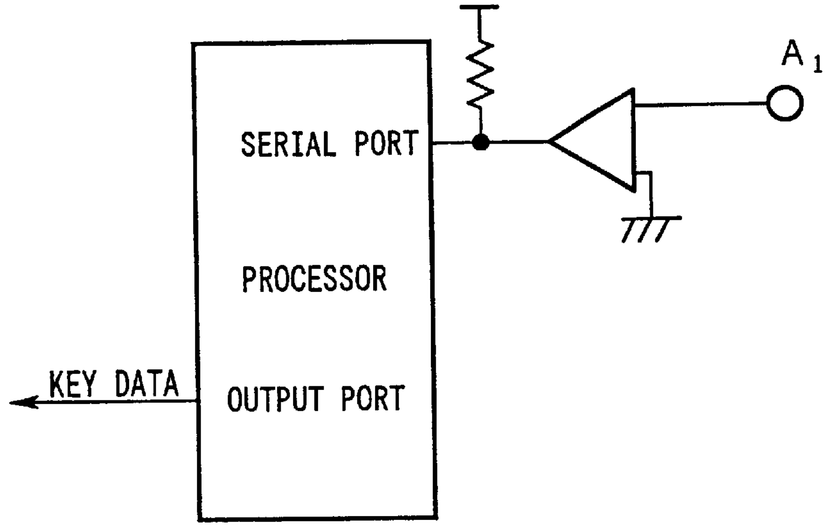

FIG. 4 explains an operation of transmitting the key data.

When the junction terminals $A_0$, $A_1$ and $B_0$, $B_1$ are contacted, respectively, the supply of power is started from the power source 221 provided to the electronic keylock circuit 220 to the keylock switch circuit 210 through the junction A, as the charge is stored in the capacitor 213. In consequence, the potential difference between the junction A and the junction B increases with the potential difference at both ends of the capacitor 213 (see FIG. 4(*a*)).

When the potential difference at both ends of the capacitor 213 exceeds a predetermined potential difference Dts, the voltage monitoring part 215 instructs the read circuit 216 to start the read operation. In response to this instruction, the read circuit 216 starts reading a key code including a certain key data stored in the memory 217. When the transistor 212 is controlled ON/OFF in accordance with the read signal obtained by the read circuit 216, the signals representing the key code are transmitted as the potential difference alternating between the junctions A and B to the electronic keylock circuit 220 as shown in FIG. 4(*a*).

When the junctions A and B are disconnected after the signals are thus transmitted, as shown in FIG. 4(*a*), the alternation in the potential difference at both ends of the capacitor gradually decreases. When the potential difference becomes lower than the predetermined threshold Dte, the voltage monitoring part 215 judges that the connection between the keylock switch and the electronic keylock is released. At this time, the transistor 214 is turned ON in accordance with the signal inputted by this voltage monitoring part 215 to the base of the transistor 214. As the transistor 214 is thus turned ON, the charge stored in the capacitor 213 is compulsively discharged. Next, each part of the keylock switch circuit 210 is initialized so as to prepare for the occasion at which the keylock switch circuit 210 and the electronic keylock circuit 220 are connected next to each other.

The signal indicating the alternation in the potential difference of junctions A and B according to the ON/OFF of transistor 212 (hereonafter called an ON/OFF signal) is isolated from the power source 221 by the impedance as a constituent element of the impedance circuit 222 provided to the electronic keylock circuit 220. Also, rectification of the diode 211 provided to the keylock switch circuit 210 isolates the ON/OFF signals from capacitor 213, too. Therefore, it is possible to stably transmit the ON/OFF signal, which is a square wave as shown in FIG. 4(*a*), to the electronic keylock circuit 220 by utilizing in common the junctions A and B used for the supply of power.

By employing a programmable ROM as the memory 217, it is possible to store the key code comprising a start bit, 64-bit key data and a stop bit, for example, by inputting the key code through a write terminal 218 during the production process of the keylock switch. The read circuit 216 serially reads out the key data so stored in the memory 217 in accordance with a predetermined clock, and transmits the key data by the ON/OFF signal described above to the electronic keylock circuit 220 through the junctions A and B. A signal detecting part 223 provided to the electronic keylock circuit 220 first digitizes the ON/OFF signal on the basis of a predetermined threshold, then reproduces the key data by applying start-stop transmission to the key code. As shown in FIG. 4(*b*), for example, the function of the signal detecting part 223 can be accomplished by inputting the ON/OFF signal inputted through the terminal $A_1$ to a comparator and inputting the output of this comparator to a serial input port (shown as a serial port in the drawing) of the processor. Then key data can be acquired from the output port of this processor.

As described above, the keylock switch circuit 210 and the electronic keylock circuit 220 are connected at the two junctions A and B so that power is supplied to the keylock switch through these two junctions A and B, and the key data held by the keylock switch circuit 210 can be delivered to the electronic keylock circuit 220.

In this way, the present invention can accomplish the keylock switch circuit that is by far more reasonably-priced and smaller in size than the conventional circuits using the IC card interface. Therefore, the present invention can drastically expand the application field of the keylock switch.

Figure 5:
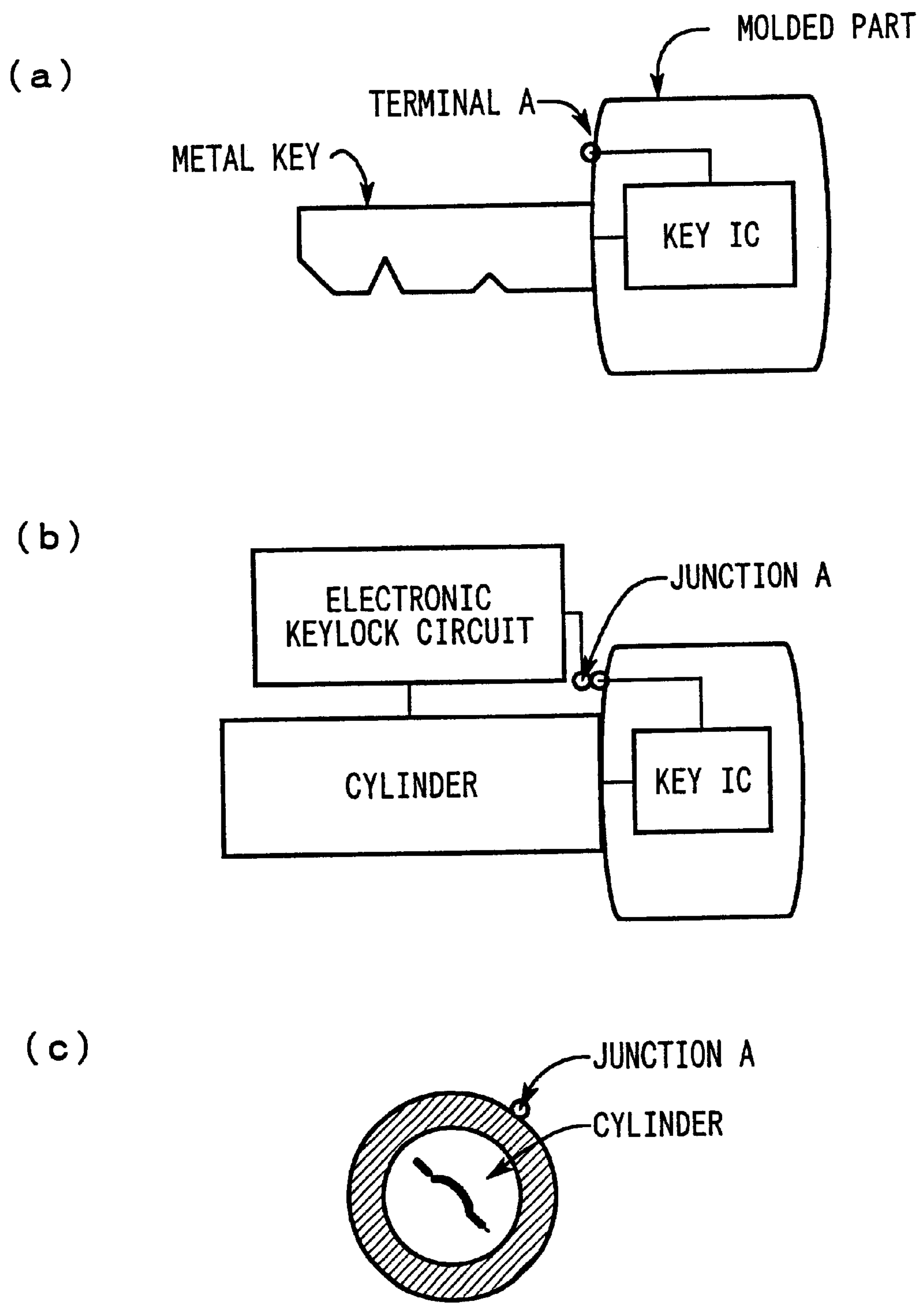
FIG. 5 shows an embodiment of the second keylock switch according to the present invention.

FIG. 5 shows the second keylock switch according to the present invention.

As shown in FIG. 5(*a*), for example, a key IC produced by integrating a keylock switch circuit is buried into a molded part covering a head portion of a metal key. A junction B is formed by utilizing the contact between the metal key itself and a metal part of a cylinder in a lock, and a terminal $A_0$ constituting a junction A is formed on the surface of the molded part. A contact point that is electrically insulated from the metal part of the cylinder is formed on the surface of the lock (see FIG. 5(*c*)). This contact point and the metal part of the cylinder are connected as terminals $A_1$ and $B_1$ of an electronic keylock circuit (see FIG. 5(*b*)). In this way, the key data can be transmitted from the keylock switch circuit built in the molded part of the metal key to the electronic keylock circuit built in the lock.

When such a configuration is adopted, the keylock switch system can be applied to the fields in which the metal keys have been utilized generally, such as ordinary houses, offices and vehicles.

Figure 6:
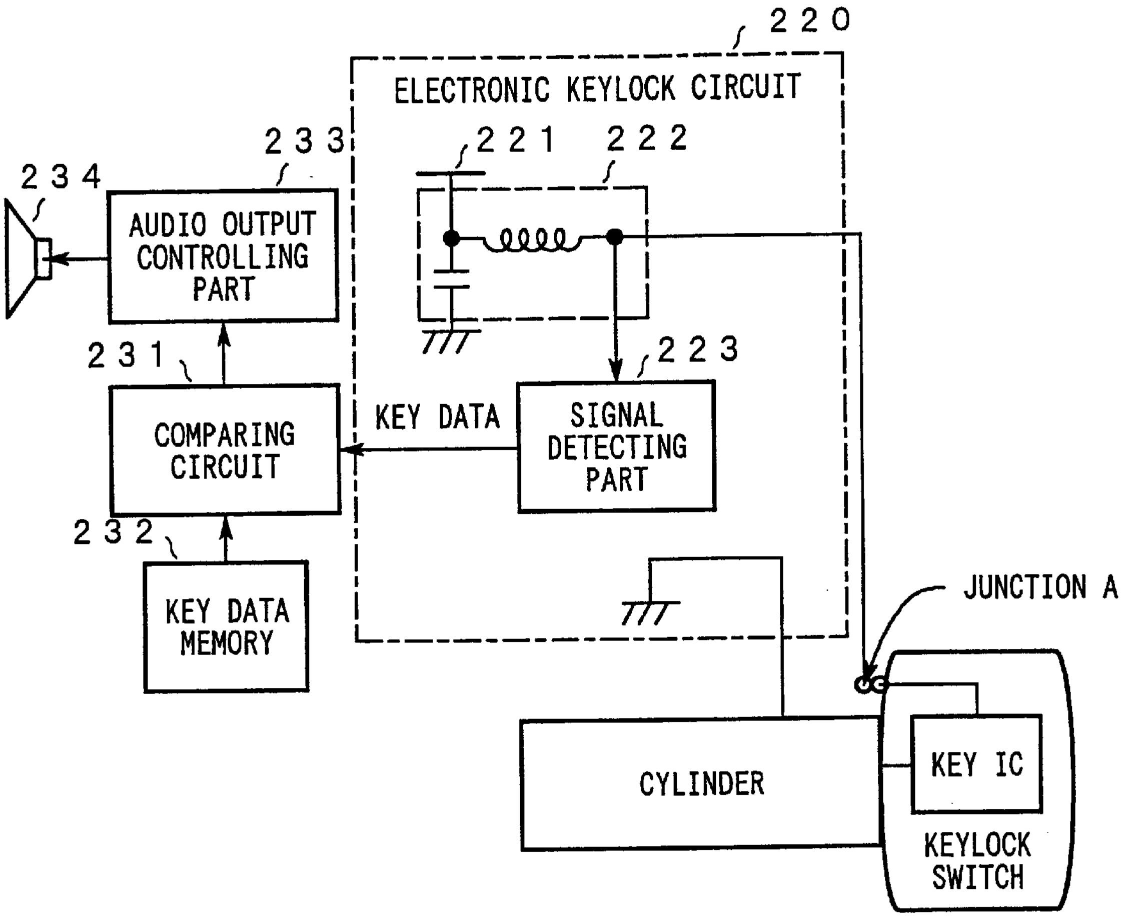
FIG. 6 shows the first embodiment of the second keylock switch system when the second keylock switch having a built-in keylock switch circuit is used in combination with a lock of a door.

FIG. 6 shows the first embodiment of a second keylock switch system using a second keylock switch having a built-in keylock switch circuit in combination with a lock of a door.

Referring to FIG. 6, the locking mechanism of the door is operated by a metal key inserted into the cylinder provided in the lock. In this operation, through junction A and junction B which is formed by the contact of the metal key and the metal part of the cylinder, the supply of power to the key IC and the transmission of the key data from the key IC to the electronic keylock circuit 220 can be made.

When the keylock switch is inserted into the cylinder, the signal detecting part 223 detects the key data from the signal transmitted through the junctions A and B, and this key data is inputted to a comparing circuit 231. The comparing circuit 231 compares the key data so inputted with reference key data stored in advance in a key data memory 232 and judges whether or not they coincide with each other. When the comparing circuit 231 judges that the input key data is not coincident with the reference key data, an audio output controlling part 233 inputs a predetermined alarm sound signal to a speaker 234.

Therefore, even when the releasing operation on a lock proves successful by a dishonest means that uses a key duplicating the form of an authentic metal key, for example, by detecting that the key data are not coincident, it can be judged that this releasing operation is unauthorized, and to raise an alarm from the speaker 234.

Figure 7:
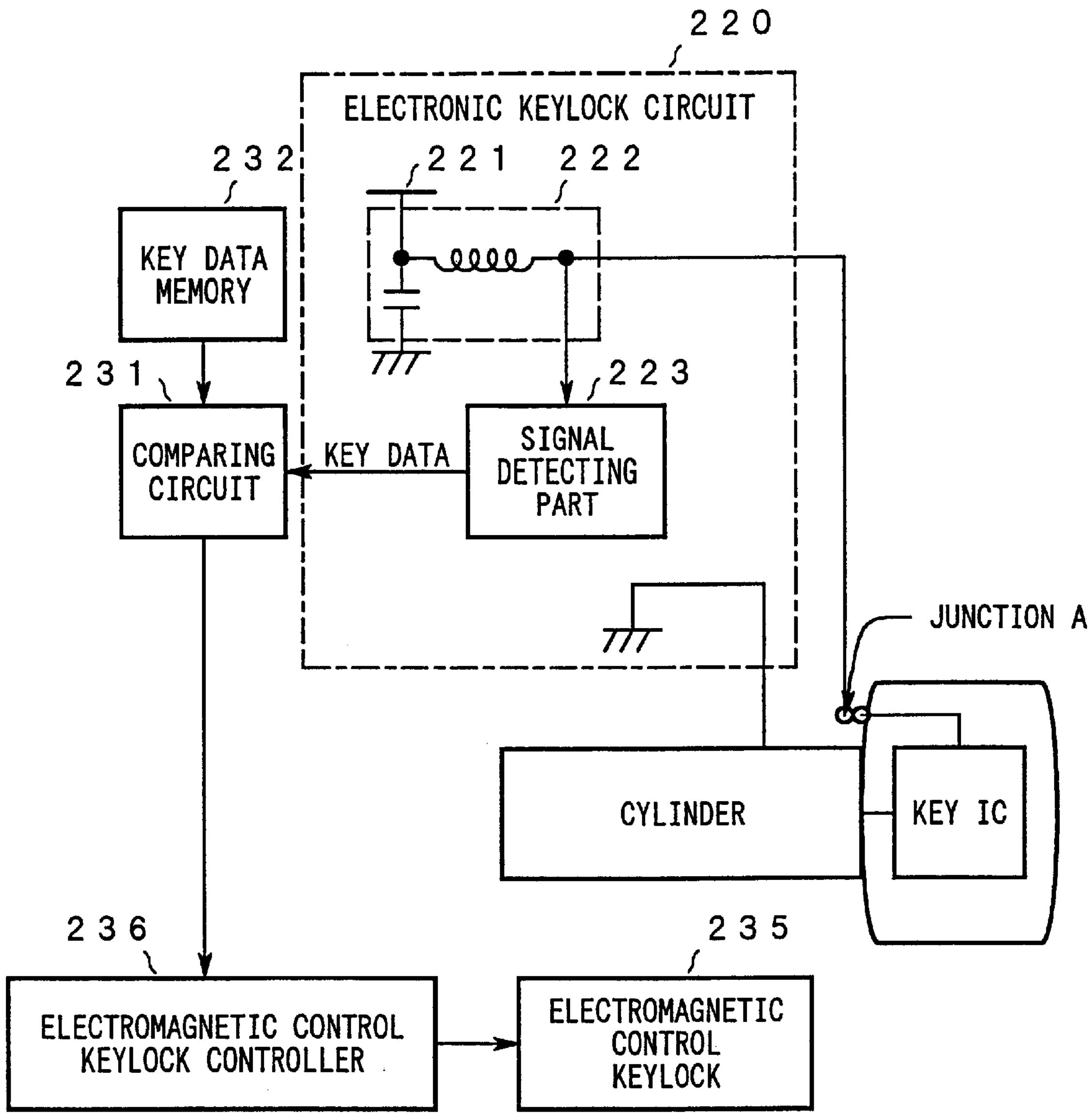
FIG. 7 shows the second embodiment of the second keylock switch system when the second keylock switch having a built-in electronic keylock switch circuit is used in combination with a lock of a door.

FIG. 7 shows the second embodiment of the second keylock switch system using the second keylock switch having a built-in keylock switch circuit in combination with the lock of the door.

In this way, a keylock switch system equipped with an electromagnetic control keylock 235 together with a cylinder operated by a metal key can be constituted as a locking mechanism of the door.

The second keylock switch system shown in FIG. 7 includes an electromagnetic control keylock controller 236 in place of the audio output controlling part 233 and the speaker 234 shown in FIG. 6. Only when the comparing circuit 231 judges that the input key data coincides with the reference key data, this electromagnetic control keylock controller 235 releases the electromagnetic lock 235.

When the keylock switch including the metal key and the electromagnetic control keylock are combined as described above, it becomes possible to prevent the unfair releasing operation so long as both of the form of the metal key and the key data transmitted from the key IC to the keylock switch circuit 220 do not coincide.

In any case, transmission of the key data is automatically executed when the keylock switch is inserted into the cylinder provided in the lock. As long as a keylock switch having a built-in key IC storing valid key data is used, no additional operation is necessary other than the normal releasing operation. Therefore, security of the locks provided to ordinary houses and the like can be improved while convenience similar to that of the conventional metal keys is insured.

The keylock switch systems described above can be applied similarly to locks provided to the doors of vehicles and ships, or start mechanism of their engines.

When the engines of vehicles and ships, for example, include an object to be electrically controlled, predetermined limitation can be applied to the operation of the control object when validity of the key data received from the keylock switch is denied.

Figure 8:
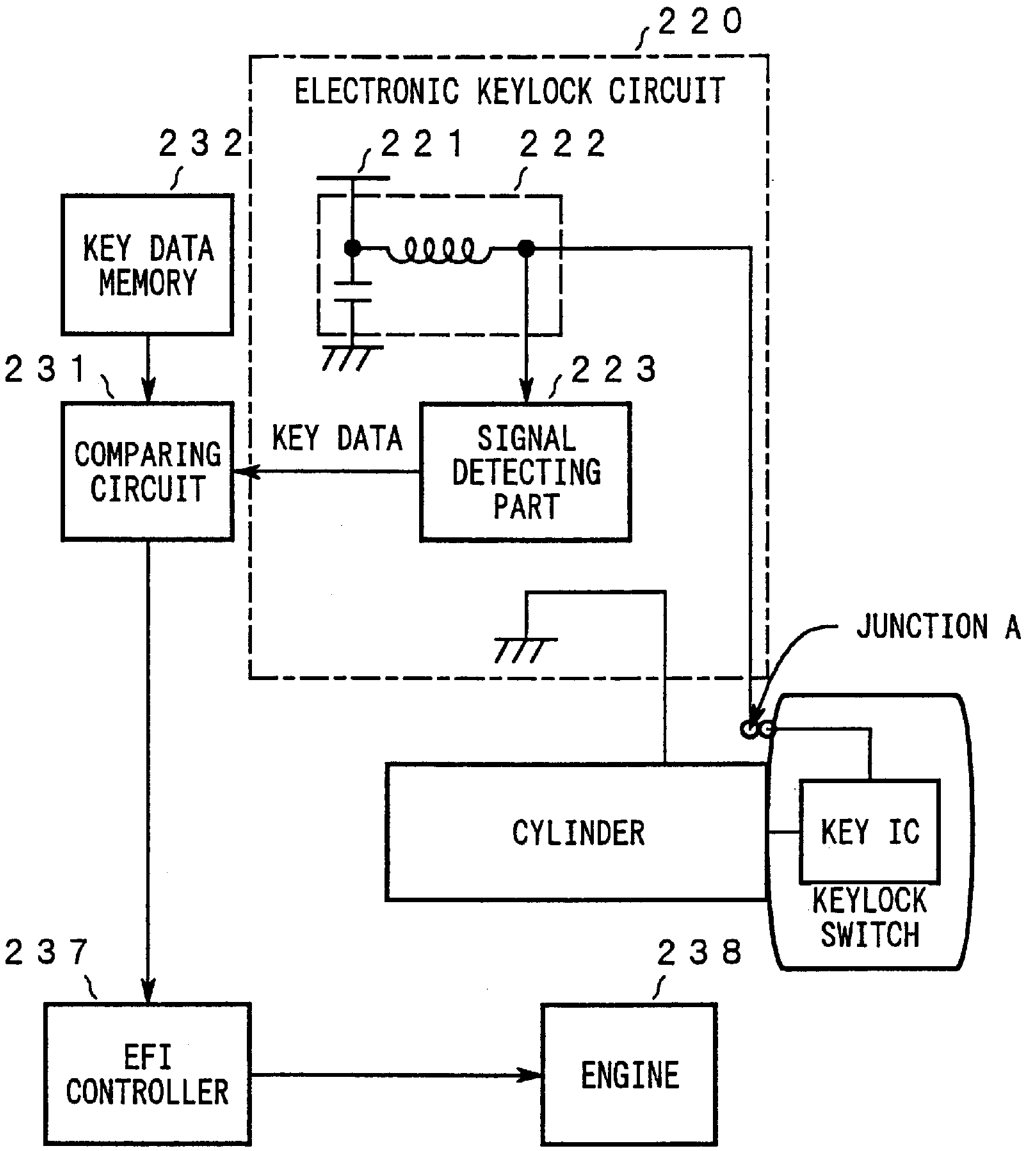
FIG. 8 shows the third embodiment of the second keylock switch system according to the present invention.

FIG. 8 shows the third embodiment of the second keylock switch system according to the present invention.

As shown in the drawing, the judgment result by the comparing circuit 231 is inputted to an electronic fuel injection controller (indicated as an EFI controller in the Figure) 237 equipped with vehicles. When the judgment result represents that the reference key data does not coincide with the input key data, the electronic fuel injection controller 237 may execute control so as to limit the quantity of the fuel supply for the engine 238 to a level below a predetermined quantity.

In this case, the quantity of the fuel supplied to the engine 238 is limited even when the engine 238 starts operating due to the starting operation by the metal key. Therefore, the car cannot run at a speed exceeding a predetermined speed. In consequence, it becomes possible to improve safety of the locks of cars in general and to prevent the theft of the cars while keeping convenience equivalent to that of the conventional metal keys.

Next, explanation is given on a keylock switch suitable for the fields in which so-called "metal keys" have not been utilized in the past.

Figure 9:
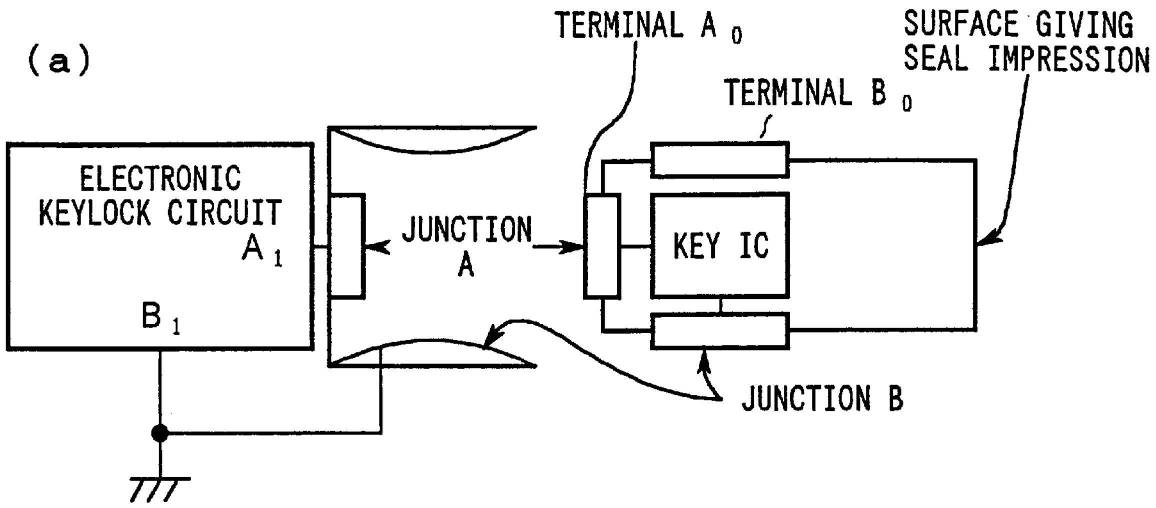
FIG. 9 shows the second embodiment of the first keylock switch according to the present invention.
Figure 9:
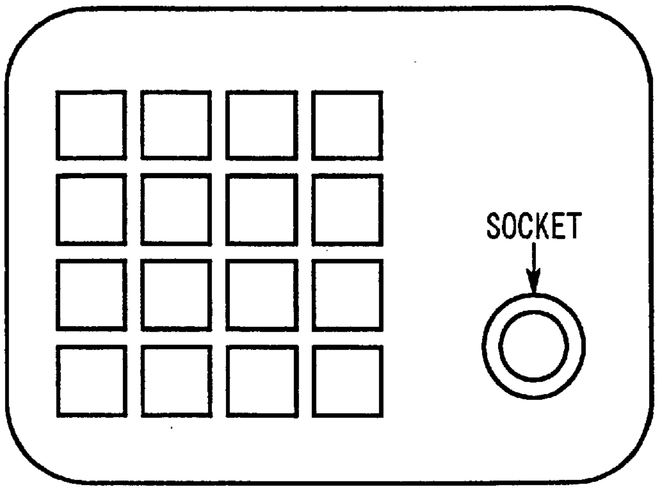

FIG. 9 shows the second embodiment of the first keylock switch.

As shown in FIG. 9(*a*), a key IC is buried into a seal impression formed of an insulating material such as a resin.

A terminal A, for forming a junction A is formed on the opposite side to the seal impression, and a ring-like terminal B is formed round the insulating material that forms the seal impression. A ring-like contact that comes into contact with the terminal $B_0$ to form a junction B and a contact that comes into contact with the contact $A_0$ are formed inside the socket that fits to the seal impression. These contacts are connected to terminals $B_1$ and $A_1$ of the electronic keylock circuit, respectively. In this way, the key data can be transmitted from the keylock switch circuit built in the seal impression to an electronic keylock circuit.

By employing the configuration described above, the keylock switch system can be applied as a security protection system in the fields that have exclusively relied on the input of personal identification numbers or passwords such as confirmation in automated teller machines and identification in utilizing personal computers. In this case, an input part such as an operation panel or a keyboard each having a socket described above may be constituted as shown in FIG. 9(*b*), for example.

Next, explanation is given on a concrete example of the keylock switch system using such a keylock switch.

Figure 10:
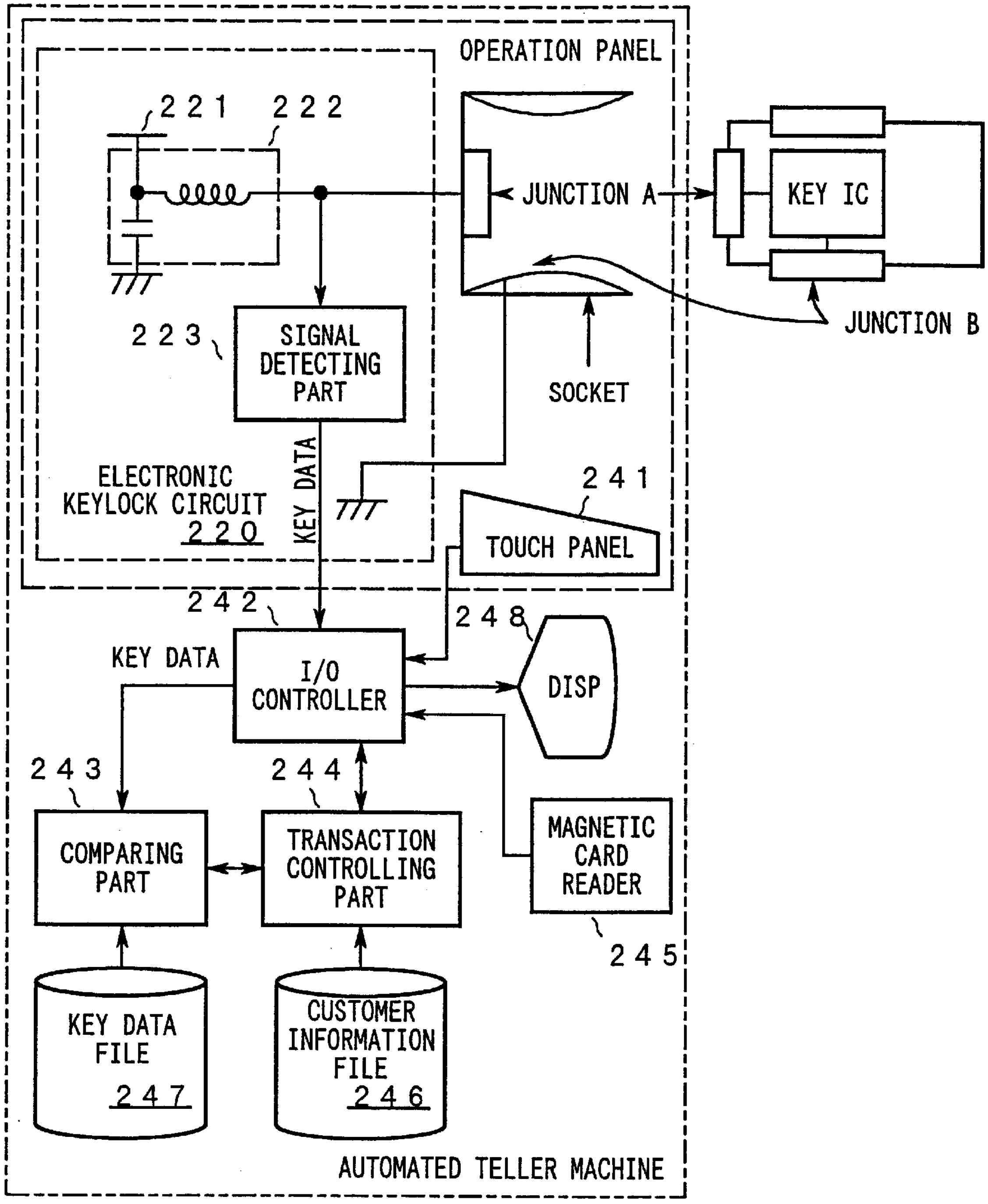
FIG. 10 shows the third embodiment of the first keylock switch system applied to a automated teller machine.

FIG. 10 shows the third embodiment of the first keylock switch system applied to an automated teller machine.

In FIG. 10, a socket for a keylock switch, and an electronic keylock circuit 220, are provided to an operation panel of an automated teller machine together with an input device such as a touch panel 241.

When an keylock switch mounted signet having a built-in key IC is inserted into the socket, a signal detecting part 223 provided to the electronic keylock circuit 220 detects key data from the signal transmitted from the key IC to the electronic keylock circuit 220 through the junctions A and B. This key data is inputted to a comparing part 243 through an input-output controller 242 (indicated as an I/O controller in the Figure) provided to the automated teller machine. The input data from the touch panel 241 described above and read data by a magnetic card reader 245 provided to the automated teller machine are delivered to a transaction controlling part 244 through the input-output controller 242.

In addition to a conventional customer information file 246 for storing customer information corresponding to an account number, the automated teller machine shown in FIG. 10 includes a key data file 247 for storing key data corresponding to the customer account number. These customer information and key data are delivered to the transaction controlling part 244 and the comparing part 243 for processing.

The automated teller machine further includes a display device such as a liquid crystal display (indicated as a DISP in the Figure) 248. The input-output controller 242 controls the operation of the liquid crystal display 248 in accordance with the instruction from the transaction controlling part 244 to thereby offer the transaction information to the customers.

Next, explanation is given on the operation of the automated teller machine.

Figure 11:
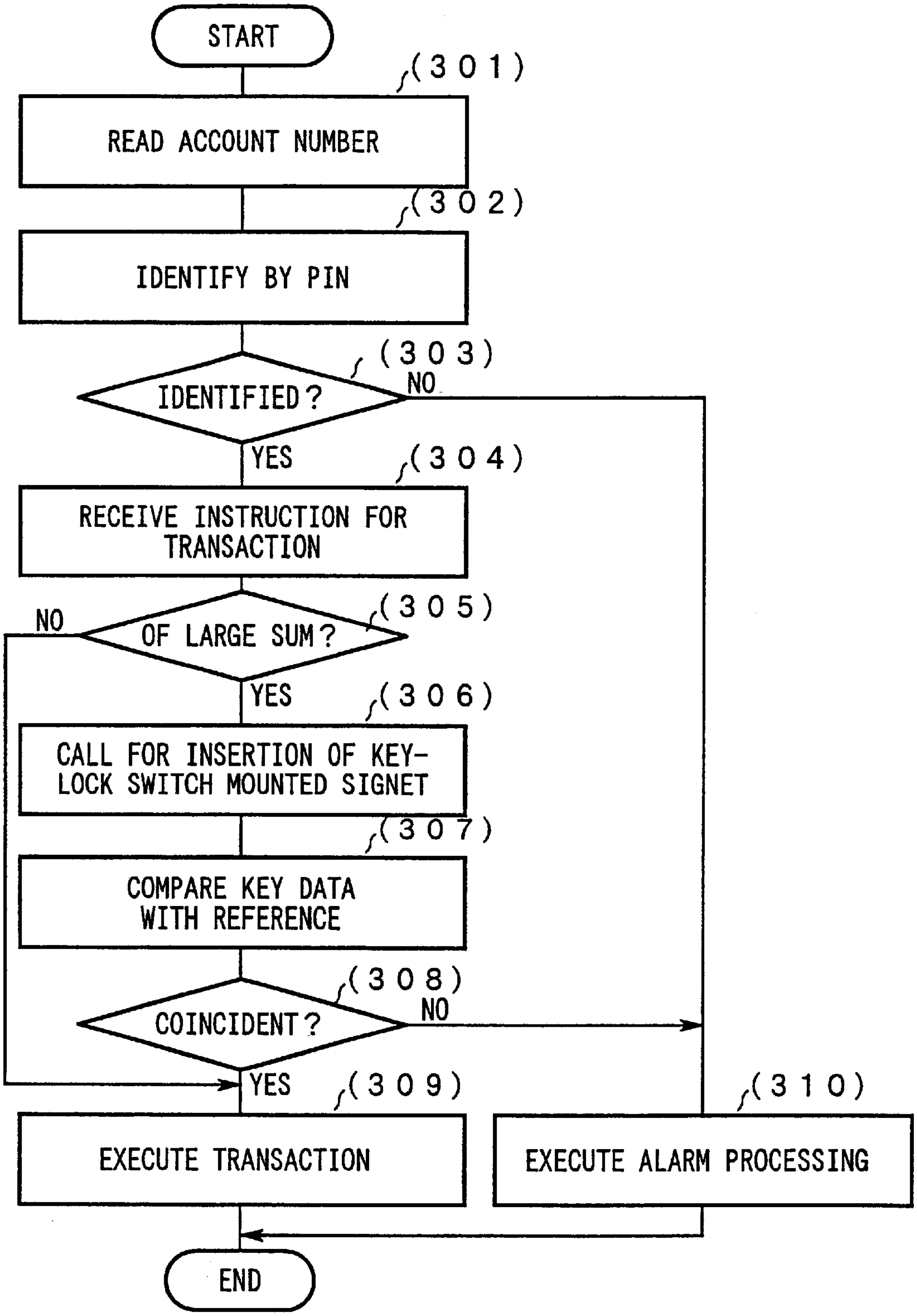
FIG. 11 shows a flowchart of an automated teller machine using a keylock switch.

FIG. 11 is a flowchart showing the operation of the automated teller machine using the keylock switch.

First, a magnetic card reader 245 reads the customer account number from a cash card (step 301) in the same way as the processing in a conventional automated teller machine. Next, the transaction controlling part 244 executes identification (step 302) on the basis of the customer identification number registered to the customer information file 246 corresponding to the account number and the customer's personal identification number (indicated as PIN in the Figure) inputted from the touch panel 241.

When this identification result proves true (YES instep 303), the flow proceeds to step 304, where the instruction on the transaction is received through the touch panel 214, and the transaction controlling part 244 judges whether or not the transaction so instructed is transaction of a large sum requiring further identification on the basis of the content of the instruction (step 305).

When the judgment result proves true (YES in step 305), the input-output controller 242 controls the display operation of the liquid crystal display 248 in accordance with the instruction from the transaction controlling part 244 to let it display a message calling for the insertion of the keylock switch mounted signet (step 306).

When the keylock switch mounted signet is inserted into the socket shown in FIG. 10 in accordance with this message, the comparing part 243 receives the key data from the signal detecting part 223 of the electronic keylock circuit 220, and compares it with the key data so registered to the key data file 247 as to correspond to the account number notified from the transaction controlling part 244 (step 307). When the inputted key data and the key data registered to the key data file 247 are coincident (YES in step 308), the transaction controlling part 244 judges that identification is duly made on the basis of the key data, executes the transaction processing in accordance with the instruction inputted in step 304 (step 309) and finishes the processing.

When the judgment result in step 308 or step 303 proves NO, on the other hand, the flow proceeds to step 310, where an appropriate alarm processing is executed as identification fails. The processing is thus completed.

When the judgment result proves NO in step 305, the flow proceeds to step 309 while the steps from 306 to 308 are skipped, and the instructed transaction is executed and is then finished in the same way as in the prior art system.

The keylock switch mounted signet shown in FIG. 9 is very small and very convenient to carry. Moreover, the deed of inserting such an keylock switch mounted signet into the socket is analogous to putting of one's seal in financial institutions and is rather familiar to customers. In comparison with the case where a customer is required to input a password in addition to the personal identification number, this system can drastically reduce the burden to the customer. Though the number of digits is so small that the customer can easily bear it in mind, identification can be made on the basis of the key data using sufficient length.

Therefore, safety of the transaction of the large sum can be improved by executing identification by the keylock switch mounted signet in addition to identification by the ordinary personal identification number, without increasing the burden to the customer.

Incidentally, the keylock switch circuit described above can be integrated into an extremely small key IC, and it can be sufficiently buried into a small seal used frequently in the daily life or into a writing instrument such as a ball-point pen.

In this case, for example, an electronic keylock circuit may be provided in a personal computer, and a socket that fits a junction terminal formed on a keylock switch mounted pen may be provided on a keyboard of the personal computer. By fitting the keylock switch mounted pen having the key IC buried therein into the socket provided on the keyboard, the key data are transmitted through the socket from the key IC to the electronic keylock circuit. By the processing unit of the personal computer receiving the key data and using the key data as a password, it is possible to identify a person according to a password having a sufficient length. This, for example, may be utilized in a process for returning from a screen saver (to the screen under operation). Consequently, it is possible to protect personal computers from unfair use.

The invention is not limited to the above embodiments and various modifications can be made without departing from the spirit and the scope of the invention. Any improvement may be made in part or all of the components.

What is claimed is:

1. A keylock switch, comprising:

first and second terminals, each comprising an electrical contact point;

charge storing means, connected between said first and second terminals, being charged by power supplied through said first and second terminals; rectifying means preventing electric charge stored in said charge storing means from flowing backward, by regulating a power supplying direction between said first terminal and said charge storing means and between said second terminal and said charge storing means;

a memory storing key data of a predetermined length; and read means reading said key data stored in said memory by utilizing power supplied from said charge storing means, and outputting said key data by changing an electrical potential between said first and said second terminals.

2. A keylock switch, comprising:

a metal key for operating mechanical components of a lock;

an insulating part covering at least a part of a head of said metal key; and a keylock switch circuit disposed inside said insulating part, wherein said keylock switch circuit comprises:

a first terminal disposed on said metal key adjacent said insulating part:

a second terminal disposed on a surface of said insulating part displaced from contact with said metal key; and a charge storing means connected between said first and second terminals, being charged by power supplied through said first and second terminals; rectifying means preventing electric charge stored in said charge storing means from flowing in a reverse direction, by regulating a power supplying direction between said first terminal and said charge storing means and between said second terminal and said charge storing means;

a memory storing key data of a predetermined length; and read means reading said key data stored in said memory by utilizing power supplied from said charge storing means, and outputting said key data by changing an electrical potential between said first and said second terminals.

3. A keylock switch system, comprising:

an electronic keylock to actuate a locking operation or a releasing operation in response to acceptance of key data; and a keylock switch inputting said key data to said electronic keylock, wherein said keylock switch comprises:

first and second terminals, each comprising an electrical contact point;

charge storing means connected between said first and second terminals, being charged by power supplied through said first and second terminals;

rectifying means preventing electric charge stored in said charge storing means from flowing in a reverse direction, by regulating power supplying direction between said first terminal and said charge storing means and between said second terminal and said charge storing means;

a memory storing key data of a predetermined length; and read means reading said key data stored in said memory by utilizing power supplied from said charge storing means, and outputtinQ said key data by changing an electrical potential between said first and said second terminals, and wherein said electronic keylock comprises:

third and fourth terminals forming two iunctions by contacting said first and second terminals, respectively;

a power source supplying driving power to said keylock switch through said third and fourth terminals; and detecting means detecting said key data from a signal between said third and fourth terminals.

4. The keylock switch system according to claim 3, further comprising:

discharging means discharging power remaining in said charge storing means, provided in said keylock switch, in response to release of said two junctions.

5. The keylock switch system according to claim 3, wherein further comprising isolating means isolating, from said power source, an AC signal between said third terminal and said fourth terminal.

6. The keylock switch system according to claim 3, further comprising:

a discharging unit discharging power remaining in said charge storing unit, provided in said keylock switch, in response to release of said two junctions.

7. The keylock switch system according to claim 3, further comprising an isolating unit isolating, from said power source, an AC signal between said third terminal and said fourth terminal.

8. A keylock switch system, comprising:

an electronic keylock to actuate a locking operation or a releasing operation in response to acceptance of key data; and a keylock switch inputting said key data to said electronic keylock, wherein said keylock switch includes:

a metal key for operating mechanical components provided to a lock;

an insulating part covering at least a part of a head of said metal key; and a keylock switch circuit disposed inside said insulating part, wherein said keylock switch circuit comprises:

a first terminal disposed on said metal key adjacent the insulating part;

a second terminal disposed on a surface of said insulating part displaced from contact with each other;

charcie storing means connected between said first and second terminals, being charged by power supplied through said first and second terminals; rectifying means preventing electric charge stored in said charge storing means from flowing in a reverse direction, by regulating a power supplying direction between said first terminal and said charge storing means and between said second terminal and said charge storing means;

a memory storing key data of a predetermined length; and read means reading said key data stored in said memory by utilizing power supplied from said charge storing means, and outputting said key data by changing an electrical potential between said first and said second terminals, and wherein said electronic keylock comprises:

a third terminal so disposed in contact with a metal member to contact said metal key and forming a first iunction;

a fourth terminal contacting said second terminal and forming a second junction;

a power source supplying driving power to said keylock switch through said third and fourth terminals; and detecting means for detecting said key data from a signal between said third and fourth terminals.

9. The keylock switch system according to claim 8, further comprising a discharging means discharging power remaining in said charge storing means, provided in said keylock switch, in response to release of said two first and second junctions.

10. The keylock switch system according to claim 8, further comprising an isolating means isolating, from said power source, an AC signal between said third terminal and said fourth terminal.

11. The keylock switch system according to claim 8, further comprising a discharging unit discharging power remaining in said charge storing unit, provided in said keylock switch, in response to release of said first and second junctions.

12. The keylock switch system according to claim 8, further comprising an isolating unit isolating, from said power source, an AC signal between said third terminal and said fourth terminal.

13. A keylock switch, comprising:

first and second terminals, each comprising an electrical contact point;

a charge storing unit connected between said first and second terminals and charged by power supplied through said first and second terminals;

a rectifier preventing electric charge stored in said charge storing unit from flowing in a reverse direction, by regulating a power supplying direction between said first terminal and said charge storing unit and between said second terminal and said charge storing unit;

a memory storing key data of a predetermined length; and a reader reading said key data stored in said memory by utilizing power supplied from said charge storing unit, and outputting said key data by changing an electrical potential between said first and said second terminals.

14. A keylock switch, comprising:

a metal key for operating mechanical components of a lock;

an insulating part covering at least a part of a head of said metal key; and a keylock switch circuit disposed inside said insulating part, wherein said keylock switch circuit comprises:

a first terminal disposed on said metal key adjacent said insulating part;

a second terminal disposed on a surface of said insulating part displaced from contact with said metal key;

a charge storing unit connected between said first and second terminals, being charged by power supplied through said first and second terminals;

a rectifier preventing electric charge stored in said charge storing unit from flowing in a reverse direction, by regulating a power supplying direction between said first terminal and said charge storing unit and between said second terminal and said charge storing unit;

a memory storing key data of a predetermined length; and a read unit reading said key data stored in said memory by utilizing power supplied from said charge storing unit, and outputting said key data by changing an electrical potential between said first and said second terminals.

15. A keylock switch system, comprising:

an electronic keylock to actuate a locking operation or a releasing operation in response to acceptance of key data; and a keylock switch inputting said key data to said electronic keylock, wherein said keylock switch comprises:

first and second terminals, each comprising an electrical contact point;

a charge storing unit connected between said first and second terminals, being charged by power supplied through said first and second terminals;

a rectifier preventing electric charge stored in said charge storing unit from flowing backward, by regulating power supplying direction between said first terminal and said charge storing unit and between said second terminal and said charge storing unit;

a memory storing key data of a predetermined length; and a read unit reading said key data stored in said memory by utilizing power supplied from said charge storing unit, and outputting said key data by changing an electrical potential between said first and said second terminals, and wherein said electronic keylock comprises:

third and fourth terminals forming two junctions by contacting said first and second terminals, respectively;

a power source supplying driving power to said keylock switch through said third and fourth terminals; and a detector detecting said key data from a signal between said third and fourth terminals.

16. A keylock switch system, comprising:

an electronic keylock to actuate a locking operation or a releasing operation in response to acceptance of key data; and a keylock switch inputting said key data to said electronic keylock, wherein said keylock switch comprises:

a metal key to operate mechanical components provided to a lock;

an insulating part covering at least a part of a head of said metal key; and a keylock switch circuit disposed inside said insulating part, wherein said keylock switch circuit comprises:

a first terminal disposed on said metal key adjacent the insulating part;

a second terminal disposed on a surface of said insulating part displaced from contact with each other;

a charge storing unit connected between said first and second terminals, being charged by power supplied through said first and second terminals;

a rectifier preventing electric charge stored in said charge storing unit from flowing in a reverse direction, by regulating a power supplying direction between said first terminal and said charge storing unit and between said second terminal and said charge storing unit;

a memory storing key data of a predetermined length; and a read unit reading said key data stored in said memory by utilizing power supplied from said charge storing unit, and outputting said key data by changing an electrical potential between said first and said second terminals; and wherein said electronic keylock comprises:

a third terminal so disposed in contact with a metal member to contact said metal key and forming a first junction;

a fourth terminal contacting said second terminal and forming a second junction;

a power source supplying driving power to said keylock switch through said third and fourth terminals; and a detector for detecting said key data from a signal between said third and fourth terminals.

* * * * *

UNITED STATES PATENT AND TRADEMARK OFFICE

CERTIFICATE OF CORRECTION

PATENT NO. : 6,778,067 B2
DATED : August 17, 2004
INVENTOR(S) : Kazumasa Kakuta

It is certified that error appears in the above-identified patent and that said Letters Patent is hereby corrected as shown below:

Column 15,
Line 45, change "outputtinQ" to -- outputting --;
Line 49, change "iunctions" to -- junctions --;
Line 63, delete "wherein";

Column 16,
Line 27, change "charcie" to -- charge --;
Line 58, delete "two".

Signed and Sealed this

Twenty-eighth Day of December, 2004

JON W. DUDAS
*Director of the United States Patent and Trademark Office*